(12) United States Patent
DiGiovanni et al.

(10) Patent No.: US 11,548,098 B2
(45) Date of Patent: Jan. 10, 2023

(54) METHODS FOR REMOVING INTERSTITIAL MATERIAL FROM SUPERABRASIVE MATERIALS OF CUTTING ELEMENTS USING ENERGY BEAMS

(71) Applicant: Baker Hughes Holdings LLC, Houston, TX (US)

(72) Inventors: Anthony A. DiGiovanni, Forest Hill, MD (US); Rocco DiFoggio, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 1164 days.

(21) Appl. No.: 15/904,708

(22) Filed: Feb. 26, 2018

(65) Prior Publication Data
US 2018/0178328 A1  Jun. 28, 2018

Related U.S. Application Data

(63) Continuation of application No. 14/851,973, filed on Sep. 11, 2015, now Pat. No. 9,931,714.

(51) Int. Cl.
*B23K 26/38* (2014.01)
*B24B 53/00* (2006.01)
(Continued)

(52) U.S. Cl.
CPC .......... *B23K 26/38* (2013.01); *B23K 26/0622* (2015.10); *B23K 26/0624* (2015.10);
(Continued)

(58) Field of Classification Search
CPC ............... B23K 26/38; B23K 26/0622; B23K 26/0624; B23K 26/144; B23K 26/53;
(Continued)

(56) References Cited

U.S. PATENT DOCUMENTS 3,482,075 A   12/1969   Wilde
3,597,578 A   8/1971   Sullivan et al.
(Continued)

FOREIGN PATENT DOCUMENTS

CN   203409429 U   1/2014
CN   203509354 U   4/2014
(Continued)

OTHER PUBLICATIONS

Chinese First Office Action for Chinese Application No. 201680060734.6 dated Mar. 27, 2019, 9 pages.
(Continued)

*Primary Examiner* — Dana Ross
*Assistant Examiner* — Joseph W Iskra
(74) *Attorney, Agent, or Firm* — TraskBritt

(57) ABSTRACT

A method of forming a cutting element for an earth-boring tool may include directing at least one energy beam at a surface of a volume of polycrystalline superabrasive material including interstitial material disposed in regions between inter-bonded grains of polycrystalline superabrasive material. The method includes ablating the interstitial material with the at least one energy beam such that at least a portion of the interstitial material is removed from a first region of the volume of polycrystalline superabrasive material without any substantial degradation of the inter-bonded grains of superabrasive material or of bonds thereof in the first region.

23 Claims, 4 Drawing Sheets

(51) Int. Cl.
  *B23K 26/53* (2014.01)
  *B23K 26/0622* (2014.01)
  *B24D 18/00* (2006.01)
  *B24D 99/00* (2010.01)
  *C04B 35/528* (2006.01)
  *C22C 26/00* (2006.01)
  *B23K 26/144* (2014.01)
  *B23K 26/06* (2014.01)
  *B23K 101/20* (2006.01)
  *E21B 10/567* (2006.01)

(52) U.S. Cl.
  CPC ...... *B23K 26/0643* (2013.01); *B23K 26/0648* (2013.01); *B23K 26/144* (2015.10); *B23K 26/53* (2015.10); *B24B 53/00* (2013.01); *B24D 18/00* (2013.01); *B24D 99/005* (2013.01); *C04B 35/528* (2013.01); *C22C 26/00* (2013.01); *B23K 2101/20* (2018.08); *C04B 2235/405* (2013.01); *C04B 2235/427* (2013.01); *C04B 2235/665* (2013.01); *E21B 10/567* (2013.01)

(58) Field of Classification Search
  CPC ............ B23K 26/0643; B23K 26/0648; B23K 2101/20; B24B 53/00; B24D 18/00; B24D 99/005; C04B 35/528; C04B 2235/405; C04B 2235/427; C04B 2235/665; C22C 26/00; E21B 10/567
  See application file for complete search history.

(56) References Cited

U.S. PATENT DOCUMENTS

| | | |
|---|---|---|
| 3,604,890 A | 9/1971 | Mullaney et al. |
| 3,749,878 A | 7/1973 | Sullivan et al. |
| 4,010,345 A | 3/1977 | Banas et al. |
| 4,224,380 A | 9/1980 | Bovenkerk et al. |
| 4,498,917 A | 2/1985 | Weinstein et al. |
| 4,533,815 A | 8/1985 | Ecer |
| RE32,036 E | 11/1985 | Dennis |
| 4,662,708 A | 5/1987 | Bagdal |
| 4,694,139 A | 9/1987 | Roder |
| 4,781,770 A | 11/1988 | Kar |
| 4,827,947 A | 5/1989 | Hinz |
| 4,847,112 A | 7/1989 | Halleux |
| 4,987,800 A | 1/1991 | Gasan et al. |
| 5,067,250 A | 11/1991 | Auweiler et al. |
| 5,127,923 A | 7/1992 | Bunting et al. |
| 5,149,936 A | 9/1992 | Walton, II |
| 5,149,937 A | 9/1992 | Babel et al. |
| 5,154,023 A | 10/1992 | Sioshansi |
| 5,247,923 A | 9/1993 | Lebourg |
| 5,286,006 A | 2/1994 | Ogura |
| 5,366,522 A | 11/1994 | Nakamura et al. |
| 5,447,208 A | 9/1995 | Lund et al. |
| 5,483,038 A | 1/1996 | Ota et al. |
| 5,504,303 A | 4/1996 | Nagy |
| 5,554,415 A | 9/1996 | Turchan et al. |
| 5,569,399 A | 10/1996 | Penney et al. |
| 5,582,749 A | 12/1996 | Mori et al. |
| 5,601,477 A | 2/1997 | Bunting et al. |
| 5,653,300 A | 8/1997 | Lund et al. |
| 5,734,146 A | 3/1998 | La Rocca |
| 5,742,026 A | 4/1998 | Dickinson, Jr. et al. |
| 5,776,220 A | 7/1998 | Allaire et al. |
| 5,826,772 A | 10/1998 | Ariglio et al. |
| 5,853,268 A | 12/1998 | Simpson |
| 5,886,320 A | 3/1999 | Gallo et al. |
| 5,944,129 A | 8/1999 | Jensen |
| 5,962,071 A | 10/1999 | Reineck et al. |
| 5,965,043 A | 10/1999 | Noddin et al. |
| 5,967,250 A | 10/1999 | Lund et al. |
| 6,000,483 A | 12/1999 | Jurewicz et al. |
| 6,023,040 A | 2/2000 | Zahavi et al. |
| 6,119,335 A | 9/2000 | Park et al. |
| 6,145,608 A | 11/2000 | Lund et al. |
| 6,204,475 B1 | 3/2001 | Nakata et al. |
| 6,326,588 B1 | 12/2001 | Neubauer et al. |
| 6,353,204 B1 | 3/2002 | Spaay et al. |
| 6,423,928 B1 | 7/2002 | Piwczyk |
| 6,469,729 B1 | 10/2002 | Ryan |
| 6,489,589 B1 | 12/2002 | Alexander |
| 6,521,862 B1 | 2/2003 | Brannon |
| 6,559,413 B1 | 5/2003 | Muenchausen et al. |
| 6,562,698 B2 | 5/2003 | Manor |
| 6,590,181 B2 | 7/2003 | Choo et al. |
| 6,596,225 B1 | 7/2003 | Pope et al. |
| 6,601,662 B2 | 8/2003 | Matthias et al. |
| 6,605,798 B1 | 8/2003 | Cullen |
| 6,655,845 B1 | 12/2003 | Pope et al. |
| 6,766,870 B2 | 7/2004 | Overstreet |
| 6,779,951 B1 | 8/2004 | Vale et al. |
| 6,844,521 B2 | 1/2005 | Staufer et al. |
| 6,845,635 B2 | 1/2005 | Watanabe et al. |
| 6,969,822 B2 | 11/2005 | Pollard |
| 7,022,941 B2 | 4/2006 | Joseph et al. |
| 7,065,121 B2 | 6/2006 | Filgas et al. |
| 7,163,875 B2 | 1/2007 | Richerzhagen |
| 7,188,692 B2 | 3/2007 | Lund et al. |
| 7,294,807 B2 | 11/2007 | Callies et al. |
| 7,323,699 B2 | 1/2008 | Hopkins et al. |
| 7,712,553 B2 | 5/2010 | Shamburger |
| 7,730,977 B2 | 6/2010 | Achilles |
| 7,757,792 B2 | 7/2010 | Shamburger |
| 8,010,224 B2 | 8/2011 | Yamaguchi et al. |
| 8,651,204 B2 | 2/2014 | Webb |
| 8,684,112 B2 | 4/2014 | DiGiovanni et al. |
| 8,741,005 B1 | 6/2014 | Dadson |
| 8,839,889 B2 | 9/2014 | DiGiovanni et al. |
| 8,919,462 B2 | 12/2014 | DiGiovanni et al. |
| 8,925,655 B1 | 1/2015 | Sani et al. |
| 8,991,525 B2 | 3/2015 | Bilen et al. |
| 9,103,174 B2 | 8/2015 | DiGiovanni |
| 2002/0104831 A1 | 8/2002 | Chang et al. |
| 2002/0148819 A1 | 10/2002 | Maruyama et al. |
| 2003/0000928 A1 | 1/2003 | Forlong |
| 2004/0163854 A1 | 8/2004 | Lund et al. |
| 2004/0198028 A1 | 10/2004 | Tanaka et al. |
| 2004/0206734 A1 | 10/2004 | Horsting |
| 2004/0238226 A1 | 12/2004 | Lin |
| 2005/0241446 A1 | 11/2005 | Joseph |
| 2006/0043622 A1 | 3/2006 | Kumazawa et al. |
| 2006/0060387 A1 | 3/2006 | Overstreet et al. |
| 2006/0070982 A1 | 4/2006 | Patel |
| 2006/0138097 A1 | 6/2006 | Hiramatsu |
| 2006/0180354 A1 | 8/2006 | Belnap et al. |
| 2006/0247769 A1 | 11/2006 | Molz et al. |
| 2006/0272571 A1 | 12/2006 | Cho |
| 2009/0114628 A1* | 5/2009 | DiGiovanni ........... B23K 26/36 219/121.72 |
| 2010/0011673 A1 | 1/2010 | Shamburger |
| 2011/0042148 A1 | 2/2011 | Schmitz et al. |
| 2011/0171414 A1 | 7/2011 | Sreshta et al. |
| 2011/0258936 A1 | 10/2011 | DiGiovanni |
| 2012/0048625 A1 | 3/2012 | Bellin |
| 2012/0103698 A1 | 5/2012 | DiGiovanni |
| 2012/0151847 A1 | 6/2012 | Ladi et al. |
| 2012/0152064 A1 | 6/2012 | Ladi et al. |
| 2012/0211284 A1 | 8/2012 | DiGiovanni |
| 2012/0225277 A1* | 9/2012 | Scott ..................... B22F 3/24 51/296 |
| 2013/0068534 A1 | 3/2013 | DiGiovanni et al. |
| 2013/0068537 A1 | 3/2013 | DiGiovanni |
| 2013/0068538 A1 | 3/2013 | DiGiovanni et al. |
| 2013/0291442 A9 | 11/2013 | Zhang et al. |
| 2014/0048338 A1 | 2/2014 | Scott |
| 2014/0134403 A1 | 5/2014 | Gledhill |
| 2014/0166371 A1 | 6/2014 | Whittaker |
| 2014/0366456 A1 | 12/2014 | Chapman et al. |
| 2015/0021100 A1 | 1/2015 | Cheng |
| 2015/0121960 A1* | 5/2015 | Hosseini ............... B23K 26/53 65/29.11 |

(56) References Cited

U.S. PATENT DOCUMENTS

| | | | |
|---|---|---|---|
| 2015/0158116 A1* | 6/2015 | Zhang | B23K 26/009 428/142 |
| 2015/0165553 A1* | 6/2015 | Gaebelein | B29C 33/3842 219/121.84 |
| 2015/0239097 A1 | 8/2015 | Chapman et al. | |
| 2015/0266163 A1 | 9/2015 | Stockey et al. | |
| 2016/0010397 A1* | 1/2016 | Stockey | E21B 10/5676 175/57 |
| 2017/0072511 A1 | 3/2017 | DiGiovanni et al. | |

FOREIGN PATENT DOCUMENTS

| | | |
|---|---|---|
| CN | 203526798 U | 4/2014 |
| EP | 0352895 A2 | 1/1990 |
| EP | 0541071 A1 | 5/1993 |
| EP | 1844891 A1 | 10/2007 |
| WO | 09804382 A1 | 2/1998 |
| WO | 0037208 A1 | 6/2000 |
| WO | 0048789 A1 | 8/2000 |
| WO | 2006038017 A2 | 4/2006 |
| WO | 2011/162999 A2 | 12/2011 |
| WO | 2012145586 A1 | 10/2012 |
| WO | 2016/007759 A1 | 1/2016 |

OTHER PUBLICATIONS

European Search Report for European Application No. 16845127.6 dated Apr. 25, 2019, 7 pages.
European Communication pursuant to Article 94(3) EPC for European Application No. 16845127, dated Jul. 7, 2020, 7 pages.
Chinese Third Office Action for Chinese Application No. 201680060734, dated May 20, 2020, 18 pages with English Translation.
Ascarelli, P., et al., "Structural Modifications of Diamond Films Induced by Pulsed Laser Treatment," SPIE, vol. 3404, pp. 178-186, 1998.
Chao, C.L., et al., Investigation of Laser Ablation of CVD Diamond Film, Proc. of SPIE, vol. 5713, pp. 21-28, 2005.
Eder, Kurt, Dies New thoughts on machinery for synthetic PCD die piercing and profiling, Wire Journal International, pp. 34-40, Dec. 1984.
Erasmus et al., Application of Raman Spectroscopy to Determine Stress in Polycrystalline Diamond Tools as a Function of Tool Geometry and Temperature, Diamond & Related Materials, vol. 20, (2011), pp. 907-911.
Gloor, S., et al., Laser ablation of diamond films in various atmospheres, Diamond and Related Materials, vol. 7, pp. 607-611, 1998.
Harrison, Paul, et al., "Enhanced Cutting of Polycrystalline Diamond with a Q-Switched Diode Pumped Solid State Laser", Powerlase Ltd., Paper #202, 8 pages, http://www.powerlase-photonics.com/wp-content/uploads/2011/data-sheets/ICALE02005_PCDPaper.pdf., 2005.
Harrison, Paul M. et al., "Laser Processing of Polycrystalline Diamond, Tungsten Carbide and a Related Composite Material", Journal of Laser Applications, vol. 18, issue 2, pp. 117-126, May 2006.
International Search Report for International Application No. PCT/US2016/050955 dated Nov. 28, 2016, 3 pages.
International Written Opinion for International Application No. PCT/US2016/050955 dated Nov. 28, 2016, 10 pages.
Karpuschewski et al., Laser Machining of Cobalt Cemented Tungsten Carbides, Towards Synthesis of Micro-/Nano-systems: The 11th International Conference on Precision Engineering (ICPE) Aug. 16-18, 2006, pp. 243-248.
Khomich, A.V., et al., Optical properties of laser-modified diamond surface, SPIE, vol. 3484, pp. 166-174, 1998.
Kim, Yong-Gi, et al., Microroughness Reduction of Tungsten Films by Laser Polishing Technology with a Line Beam, Japanese Journal of Applied Physics, vol. 43, No. 4A, pp. 1315-1322, 2004.
Kiwus, Ulrich, Grinding and polishing of diamond wire dies with ultra-hard, ready-made needles and direct ultrasound generators, Wire, vol. 42, pp. 98-99, Feb. 1992.
Kononenko, V.V.., et al., Control of laser machining of polycrystalline diamond plates by the method of low-coherence optical interferometry, Quantum Electronics, vol. 35, No. 7, pp. 622-626, Jul. 2005.
Konov, V.I., et al., Laser microprocessing of diamond and diamond-like films, SPIE vol. 2045, pp. 184-192, 1994.
Laguarta, F., et al., "Laser application for optical glass polishing", SPIE, vol. 2775, pp. 603-610, 1996.
Levy, Aron, "Drilling, Sawing, and Contouring Industrial and Gem Diamonds by Laser", pp. 223-236, no publication info or date.
Li et al., In Situ Diagnosis of Pulsed UV Laser Surface Ablation of Tungsten Carbide Hardmetal by Using Laser-Induced OPtical Emission Spectrosopy, Applied Surface Science, vol. 185, (2001), pp. 114-122.
Li et al., Laser-Induced Breakdown Spectroscopy for On-Line Control of Selective Removal of Cobalt Binder from Tungsten Carbide Hardmetal by Pulsed UV Laser Surface Ablation, Applied Surface Science, vol. 181, (2001), pp. 225-233.
Meijer, J., et al., "Laser Machining by short and ultrashort pulses, state of the art and new opportunities in the age of the photons", 20 pages, CIRP Annals-Manufacturing Technology, 2002.
Meijer, Johan, "Laser beam machining (LBM), state of the art and new opportunities", Journal of Materials Processing Technology, vol. 149, pp. 2-17, 2004.
Murahara, Masataka, "Excimer Laser-Induced Photochemical Polishing of SiC Mirror", Proc. SPIE, vol. 4679, pp. 39-74, 2002.
Nowak, K.M., et al., "A model for "cold" laser ablation of green state ceramic materials", Appl. Phys. A, vol. 91, pp. 341-348, 2008.
Pimenov, S.M. et al., Laser Polishing of Diamond Plates, Appl. Phys. A, vol. 69, pp. 81-88, 1999.
Quintero, F., et al., "Optimization of an off-axis nozzle for assist gas injection in laser fusion cutting", Optics and Lasers in Engineering, vol. 44, pp. 1158-1171, 2006.
Reimer, Craig, Stay Cool! New PDC Cutter Improves ROP, Tallys, hggp://tallys.ca/stay-cool-new-pdc-cutter-improves-rop/, visited Feb. 27, 2014, 1 page.
Scott et al., PDC Cutter Geometry Improves ROP, Increases Footage Drilled by 37%, http://www.drillingcontractor.org, Posted Dec. 11, 2013, 5 pages.
Smith, Maurice, "Drilling & Completions, Cutting Edge, PDC Bits Increasingly Displace Roller Cone Bits as Technology Rapidly Evolves", New Technology Magazine, 8 pages, Jan./Feb. 2005.
SPE, "Faster and Longer Bit Runs With New-Generation PDC Cutter", JPT, pp. 73-75, Dec. 2006.
SPE, "New Bit Design and Cutter Technology Extend PDC Applications to Hard-Rock Drilling", JPT, pp. 63-64, Dec. 2005.
Stockey et al., U.S. Appl. No. 14/329,380, titled Cutting Elements Comprising Partially Leached Polycrystalline Material Tools Comprising Such Cutting Elmements, and Methods of Forming Wellbores Using Such Cutting Elements, filed Jul. 11, 2014.
Underwood, Quantitative Stereology, 103 105 (Addison-Wesley Publishing Company, Inc., 1970).
Watson, G.R., et al., "Using New Computational Fluid Dynamics Techniques to Improve PDC Bit Performance", SPE/IADC 37580, pp. 91-105, 1997.
Windholz, R., et al., Nanosecond pulsed excimer laser machining of chemical vapour deposited diamond and highly oriented pyrolytic graphite, Part I, An experimental investigation, Journal of Materials Science, vol. 32, pp. 4295-4301, 1997.
Xu, Feng, et al., Study on Energy Density Needed in ND:YAG Laser Polishing of CVD Diamond Thick-Film, 7th International Conference on Progress of Machining Technology, pp. 382-387, Dec. 8-11, 2004.
Zhang, G.F., et al., "An Experimental Study on Laser Cutting Mechanisms of Polycrystalline Diamond Compacts", Annals of the CIRP, vol. 56, No. 1, pp. 201-204, 2007.

(56) References Cited

OTHER PUBLICATIONS

Chinese Rejection Decision for Chinese Application No. 201680060734, dated Oct. 10, 2020, 14 pages with translation.

* cited by examiner

METHODS FOR REMOVING INTERSTITIAL MATERIAL FROM SUPERABRASIVE MATERIALS OF CUTTING ELEMENTS USING ENERGY BEAMS

CROSS-REFERENCE TO RELATED APPLICATION

This application is a continuation of U.S. patent application Ser. No. 14/851,973, filed Sep. 11, 2015, the disclosure of which is hereby incorporated herein in its entirety by this reference.

TECHNICAL FIELD

Embodiments of the present disclosure relate generally to forming cutting elements and, more particularly, to removing interstitial material from spaces between inter-bonded grains of superabrasive material in a superabrasive table of a cutting element with electromagnetic radiation.

BACKGROUND

Earth-boring tools for forming wellbores in subterranean earth formations generally include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit. In other words, earth-boring tools typically include a bit body to which cutting elements are attached.

The cutting elements used in such earth-boring tools often include polycrystalline diamond compacts (often referred to as "PDCs"), which include cutting faces of a polycrystalline diamond material. Polycrystalline diamond material is material that includes inter-bonded grains or crystals of diamond material. In other words, polycrystalline diamond material includes direct, inter-granular bonds between the grains or crystals of diamond material. The terms "grain" and "crystal" are used synonymously and interchangeably herein.

Polycrystalline diamond compact cutting elements are typically formed by sintering and bonding together relatively small diamond grains under conditions of high temperature and high pressure in the presence of a catalyst (e.g., a metal solvent catalyst such as cobalt, iron, nickel, or alloys and mixtures thereof) to form a layer (e.g., a compact or "table") of polycrystalline diamond material on a cutting element substrate. These processes are often referred to as high temperature/high pressure (HTHP) processes, and may involve a temperature of at least about 1300° Celsius and a pressure between about 5 GPa and 9 GPa to sinter and bond together the diamond grains. The substrate may comprise a cermet material (i.e., a ceramic-metal composite material) such as, for example, cobalt-cemented tungsten carbide. In such instances, the cobalt (or other catalyst material) in the substrate may be swept into the diamond grains during sintering and serve as the catalyst material for forming the inter-granular diamond-to-diamond bonds, and the resulting diamond table, from the diamond grains. In other methods, powdered catalyst material may be mixed with the diamond grains prior to sintering the grains together in a HTHP process.

Upon formation of a diamond table using a HTHP process, catalyst material may remain in interstitial spaces between the inter-bonded grains of diamond in the resulting polycrystalline diamond compact. The presence of the catalyst material in the diamond table may contribute to thermal damage in the diamond table when the cutting element is heated during use, due to friction at the contact point between the cutting element and the formation.

Polycrystalline diamond compact cutting elements in which the catalyst material remains in the polycrystalline diamond compact are generally thermally stable up to a temperature of about 750° C., although internal stress within the cutting element may begin to develop at temperatures exceeding about 350° C. This internal stress is at least partially due to differences in the rates of thermal expansion between the diamond table and the substrate to which it is bonded. This differential in thermal expansion rates may result in relatively large compressive and tensile stresses at the interface between the diamond table and the substrate, and may cause the diamond table to delaminate from the substrate. At temperatures of about 750° C. and above, stresses within the diamond table itself may increase significantly due to differences in the coefficients of thermal expansion of the diamond material and the catalyst material within the diamond table. For example, cobalt thermally expands significantly faster than diamond, which may cause cracks to form and propagate within the diamond table, eventually leading to deterioration of the diamond table and ineffectiveness of the cutting element.

Furthermore, at temperatures at or above about 750° C., some of the diamond crystals within the polycrystalline diamond compact may react with the catalyst material causing the diamond crystals to undergo a chemical breakdown or back-conversion to another allotrope of carbon or another carbon-based material. For example, the diamond crystals may graphitize at the diamond crystal boundaries, which may substantially weaken the diamond table. In addition, at extremely high temperatures, in addition to graphite, some of the diamond crystals may be converted to carbon monoxide and carbon dioxide.

In order to reduce the problems associated with differential rates of thermal expansion and chemical breakdown of the diamond crystals in polycrystalline diamond compact cutting elements, so-called "thermally stable" polycrystalline diamond compacts (which are also known as thermally stable products, or "TSPs") have been developed. Such a thermally stable polycrystalline diamond compact may be formed by leaching the catalyst material (e.g., cobalt) out from interstitial spaces between the inter-bonded diamond crystals in the diamond table using, for example, an acid or combination of acids. For example, the hard polycrystalline material may be leached using a leaching agent and process such as those described more fully in, for example, U.S. Pat. No. 5,127,923 to Bunting et al., (issued Jul. 7, 1992), and U.S. Pat. No. 4,224,380 to Bovenkerk et al., (issued Sep. 23, 1980), the entire disclosure of each of which is incorporated herein by this reference. Specifically, aqua regia (a mixture of concentrated nitric acid ($HNO_3$) and concentrated hydrochloric acid (HCl)) may be used to at least substantially remove catalyst material from the interstitial spaces between the inter-bonded grains in the hard polycrystalline material of the diamond table. It is also known to use boiling hydrochloric acid (HCl) and boiling hydrofluoric acid (HF) as leaching agents. One particularly suitable leaching agent is hydrochloric acid (HCl) at a temperature of above 110° C., which may be provided in contact with the hard polycrystalline material of the diamond table for a period of about two hours to about 60 hours, depending upon the size of the body comprising the hard polycrystalline material. Some leaching processes even involve contacting the hard polycrystalline material with a leaching agent for multiple weeks or longer. The leaching depth within the diamond table is generally controlled by liquid acid diffusion through the microstructure of the hard polycrystalline material. After leaching the hard polycrystalline material, the interstitial spaces between the inter-bonded grains within the hard polycrystalline material may be at least substantially free of catalyst material used to catalyze formation of inter-granular bonds between the grains in the hard polycrystalline material. In some embodiments, leaching may be selectively applied to specific regions of the diamond table and not to other regions. For example, in some embodiments, a mask may be applied to a region of the diamond table and only the unmasked regions may be leached.

BRIEF SUMMARY

In some embodiments of the present disclosure, a method of forming a cutting element for an earth-boring tool includes directing at least one energy beam at a surface of a volume of polycrystalline superabrasive material of the cutting element, the volume of polycrystalline superabrasive material including interstitial material disposed in regions between inter-bonded grains of polycrystalline superabrasive material. The method includes ablating the interstitial material with the at least one energy beam such that at least a portion of the interstitial material is removed from a first region of the volume of polycrystalline superabrasive material without any substantial degradation of the inter-bonded diamond grains or of bonds thereof in the first region.

In other embodiments, a method of forming a cutting element for an earth-boring tool includes emitting at least one energy beam from an emitter and directing the at least one energy beam with one or more mirrors to an outer surface of a volume of polycrystalline diamond of the cutting element. The volume of polycrystalline diamond comprises interstitial metal catalyst material located within regions between inter-bonded grains of polycrystalline diamond. The at least one energy beam has a wavelength between about 200 nm and about 800 nm at a location at which the at least one energy beam impinges against the outer surface of the volume of polycrystalline diamond. The method includes ablating the interstitial metal catalyst material with the at least one energy beam such that at least a portion of the interstitial metal catalyst material is removed from a region of the volume of polycrystalline diamond without any substantial degradation of the inter-bonded grains of polycrystalline diamond or of bonds thereof in the region of the volume of polycrystalline diamond.

DETAILED DESCRIPTION

The illustrations presented herein are not meant to be actual views of any particular cutting element, volume of superabrasive material, laser ablation system or constituent component thereof, but are merely idealized representations employed to describe illustrative embodiments. Thus, the drawings are not necessarily to scale.

Figure 1:
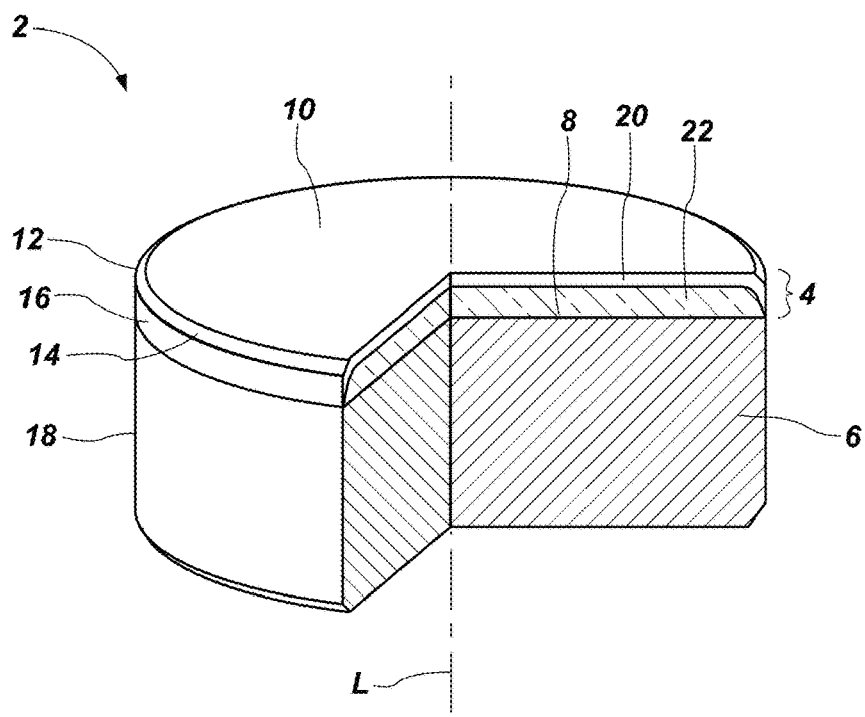
FIG. 1 illustrates a simplified perspective view of a cutting element showing a cutaway portion, according to an embodiment of the present disclosure.

FIG. 1 illustrates a partially cutaway view of a cutting element 2 formed according to an embodiment of the present disclosure. The cutting element 2 may include a volume of superabrasive material 4 disposed on a substrate 6. The volume of superabrasive material 4 may comprise inter-bonded grains of superabrasive material such as, for example, synthetic diamond, natural diamond, a combination of synthetic diamond and natural diamond, polycrystalline diamond (PCD), or other superabrasive materials known in the art. It is to be appreciated that other types of superabrasive materials may be employed and may comprise inter-bonded grains of superabrasive material with undesirable interstitial material disposed in spaces between the inter-bonded grains. The volume of superabrasive material 4 is often referred to in the art as a "superabrasive table," and, when the volume of superabrasive material 4 comprises polycrystalline diamond, the volume of superabrasive material 4 is often referred to in the art as a "diamond table."

The volume of superabrasive material 4 may include interstitial material located within spaces between the inter-bonded grains of superabrasive material. The interstitial material may comprise a catalytic material. As used herein, the term "catalytic" means catalytic to the formation of inter-granular bonds between grains of superabrasive material in an HTHP process. By way of non-limiting example, the interstitial material may comprise a Group VIII metal solvent catalyst, such as cobalt, iron, nickel, or alloys or mixtures thereof. In other embodiments, the interstitial material may include a non-catalytic material. The interstitial material may comprise between about 0.1% and about 15% by volume of the superabrasive material.

The volume of superabrasive material 4 may be formed on the substrate 6, or the volume of superabrasive material 4 and the substrate 6 may be separately formed and subsequently attached together at an interface 8. The volume of superabrasive material 4 may have a cutting face 10 located opposite the interface 8 and extending generally transverse to a longitudinal axis L of the cutting element 2. An outer peripheral edge of the cutting face 10 (as the cutting element 2 is mounted to a body of an earth-boring tool) may be defined as a cutting edge 12 by which the cutting element 2 engages and cuts subterranean earth formation material. The volume of superabrasive material 4 may have a single chamfer surface 14 extending radially inward from the cutting edge 12, as shown in FIG. 1, or may have multiple chamfer surfaces and/or a rounded peripheral edge (not shown). The volume of superabrasive material 4 may have a side surface 16 extending longitudinally from the cutting edge 12 to the interface 8 between the volume of superabrasive material 4 and the substrate 6. The substrate 6 may have a side surface 18 extending from the interface 8 to a rear surface of the substrate located opposite the interface 8.

The substrate 6 may be formed from a material that is relatively hard and resistant to wear. For example, the substrate 6 may be formed from and include a ceramic-metal composite (i.e., "cermet") material. The substrate 6 may include a cemented carbide material, such as cobalt-cemented tungsten carbide, in which tungsten carbide particles are cemented together in a metallic binder material including cobalt. Other metallic binder materials may include, for example, nickel, iron, or alloys and mixtures thereof. Alternatively, other substrate materials may be used.

It is to be appreciated that, while the cutting element 2 shown in FIG. 1 has a generally cylindrical shape, other shapes are within the scope of the present disclosure. By way of non-limiting example, the cutting element 2 may have an elliptical, rectangular, triangular or tombstone shape when viewed in a plane transverse to the longitudinal axis L of the cutting element 2. Additionally, while the cutting face 10 of the volume of superabrasive material 4 is shown as being generally planar, the cutting face 10 may include shaped features and non-planar geometries, such as any of those disclosed in U.S. Pat. No. 8,684,112, issued on Apr. 1, 2014 to DiGiovanni et al.; U.S. Pat. No. 8,919,462, issued on Dec. 20, 2014 to DiGiovanni et al.; and U.S. Pat. No. 9,103,174, issued on Aug. 11, 2015 to DiGiovanni et al.; and U.S. Patent Publication No. 2013/0068534 A1, published Mar. 21, 2013 to DiGiovanni et al., the entire disclosure of each of which is incorporated herein by this reference. Furthermore, while the interface 8 between the volume of superabrasive material 4 and the substrate 6 may be generally planar, as shown in FIG. 1, the interface 8 may also include shaped features and non-planar geometries.

With continued reference to FIG. 1, the volume of superabrasive material 4 may include a first region 20 having interstitial material at least partially removed from spaces between the inter-bonded diamond grains and a second region 22 in which substantially no interstitial material has been removed. As shown, the first region 20 may be located adjacent outer surfaces of the volume of superabrasive material 4 (as the cutting element 2 is to be positioned on an earth-boring tool), such as the cutting face 10, the chamfer surface 14 and the side surface 16, while the second region 22 may be generally located inward of the first region 20 into the volume of superabrasive material 4. The first region 20 may be formed by removing at least some of the interstitial material from the spaces between the inter-bonded grains of superabrasive material with a laser ablation process. As used herein, the term "ablation" refers to sublimation of solid material into a gaseous phase responsive to an application of energy to the solid material. When a focused laser beam irradiates the target material with a wavelength substantially absorbed by the target material and at a fluence greater than a threshold fluence of the target material, the target material will sublimate into a free expanding plasma plume and escape the microstructure of the superabrasive material. As used herein, the term "fluence" means optical energy delivered per unit area and is expressed in units of joules per square centimeter ($J/cm^2$).

Figure 2:
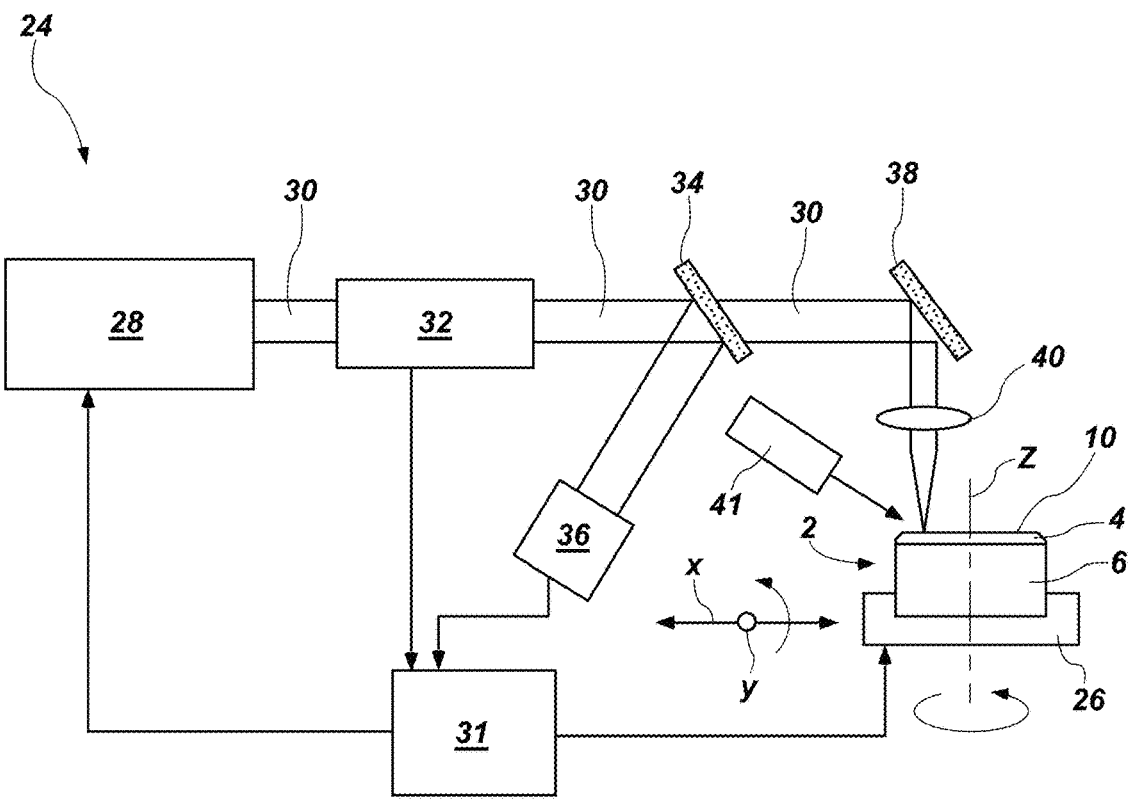
FIG. 2 illustrates a schematic diagram of a laser ablation system for removing interstitial material from spaces between inter-bonded grains of superabrasive material within a volume of superabrasive material of a cutting element, according to an embodiment of the present disclosure.

FIG. 2 illustrates a schematic diagram of an example laser ablation system 24 for removing interstitial material from one or more portions of the volume of superabrasive material 4 while substantially not degrading the inter-bonded grains of superabrasive material within the volume of superabrasive material 4, according to an embodiment of the present disclosure. The laser ablation system 24 may include a chuck 26 configured to hold and position the cutting element 2 in relation to at least one emitter 28. While only one emitter is illustrated in FIG. 2, it is to be appreciated that two or more emitters 28 may be utilized to ablate interstitial material from the volume of superabrasive material 4. As used herein, the term "chuck" means any tool or device configured to temporarily hold and position a cutting element 2. The emitter 28 may be configured to emit a focused energy beam 30 toward one or more preselected portions of the volume of superabrasive material 4. The chuck 26 may be configured to translate on the x- and y-axes and rotate about at least the z-axis and the y-axis, by way of non-limiting example. The z-axis, about which the chuck 26 may rotate the cutting element 2, may be coincident with the longitudinal axis L of the cutting element 2. It is to be appreciated that additional or fewer degrees of translation and rotation of the chuck 26 are also within the scope of the present disclosure to orient the volume of superabrasive material 4 in relation to the beam 30. The chuck 26 may be operatively coupled to a controller 31 configured to manipulate the chuck 26 to orient the cutting element 2 relative to the beam 30. It is to be appreciated that the chuck 26 may orient the cutting face 10 or the lateral side surface 16 of the volume of superabrasive material 4 perpendicular to the focused beam 30, as shown in FIG. 2, or at one or more non-perpendicular angles with respect to the beam 30. In further embodiments, the chuck 26 may vary the angle between the superabrasive material and the beam 30 during the ablation process. The controller 31 may include a processor and may optionally be incorporated in a PC configured to be operated by a user.

In some embodiments, emitter 28 may comprise a laser device configured to emit a laser beam. In other embodiments, the emitter 28 may comprise a device configured to emit a beam of particles, such as an ion beam, an electron beam or a molecular beam. Accordingly, it is to be appreciated that any of the following references to an emitter 28 or laser 28 or a laser beam 30 in this description may also synonymously refer to an ion beam emitter, an electron beam emitter, a molecular beam emitter, an ion beam, an electron beam and a molecular beam, respectively.

The laser 28 may be positioned and controlled in a manner analogous to standardized computer numerical control (CNC) machining processes employed in various other applications. The laser 28 may be configured to emit an energy beam 30 at any wavelength that will be substantially, or even at least partially, absorbed by the interstitial material substantially without diffusing or vaporizing the grains of superabrasive polycrystalline material in the volume of superabrasive material 4. Diamond material, including polycrystalline diamond, is "transparent" (i.e., substantially does not absorb energy) in a spectrum having wavelengths between about 230 nm and far infrared wavelengths (although impurities within the diamond may affect the absorption spectrum). Accordingly, in embodiments where the volume of superabrasive material 4 comprises polycrystalline diamond, the energy beam 30 may have a wavelength greater than 230 nm and less than far infrared wavelengths. The laser 28 may be further configured to emit an energy beam 30 at a fluence, and, when employing a pulsed laser 28, a pulse duration (also termed "pulse width") and pulse rate, sufficient to ablate the interstitial material. The laser 28 may be further configured to deliver a predetermined number of laser pulses or laser shots (each laser shot comprising a number of pulses determined by the pulse width and pulse rate of the laser) to a particular region of the superabrasive material. For example, the laser 28 may be a pulsed laser configured to emit a beam 30 at a fluence between about 0.25 J/cm$^2$ and about 25 J/cm$^2$, a wavelength between about 120 nanometers ("nm") and about 3,000 nm, a pulse width between about 2 nanoseconds ("ns") and 300 ns, a pulse rate between about 1 Hz and about 200 Hz and deliver between about 25 and 1000 or more laser pulses and between about 100 and 900 laser shots.

For example, the laser 28 may be a UV excimer laser, such as an $Ar_2$ excimer laser configured to emit an energy beam at a wavelength of about 126 nm. In other embodiments, the laser 28 may be a $Kr_2$ excimer laser configured to emit an energy beam 30 at a wavelength of about 146 nm. In yet other embodiments, the laser 28 may be a $F_2$ excimer laser configured to emit an energy beam 30 at a wavelength of about 157 nm. In yet other embodiments, the laser 28 may be a $Xe_2$ excimer laser configured to emit an energy beam 30 at a wavelength of about 172 nm or about 175 nm. In additional embodiments, the laser 28 may be an ArF excimer laser configured to emit an energy beam 30 at a wavelength of about 193 nm. In yet additional embodiments, the laser 28 may be a KrCl excimer laser configured to emit an energy beam 30 at a wavelength of about 222 nm. In yet other additional embodiments, the laser 28 may be a KrF excimer laser configured to emit an energy beam 30 at a wavelength of about 248 nm. In further embodiments, the laser 28 may be a XeBr excimer laser configured to emit an energy beam 30 at a wavelength of about 282 nm. In yet further embodiments, the laser 28 may be a XeCl excimer laser configured to emit an energy beam 30 at a wavelength of about 308 nm. In still further embodiments, the laser 28 may be a XeF excimer laser configured to emit an energy beam 30 at a wavelength of about 351 nm. In other further embodiments, the laser 28 may be an Nd:YAG laser with a wavelength of about 532 nm. When the volume of superabrasive material 4 comprises cobalt disposed within interstitial spaces between inter-bonded diamond crystals, the laser 28 may be a Nd:YAG laser configured (in this instance, "frequency doubled") to emit an energy beam 30 at a wavelength of about 532 nm or a XeCl excimer laser configured to emit an energy beam 30 at a wavelength of about 308 nm. Any of the foregoing beams 30 may optionally be modified with an attenuator or other beam-modifying component. A beam 30 having a wavelength between about 230 nm and about 800 nm may be particularly effective at being absorbed (and thus ablating) cobalt interstitial material while being substantially not absorbed, or being only negligibly absorbed, by grains of superabrasive material, such as polycrystalline diamond, although higher wavelengths are also possible. It is to be appreciated that other laser types with other beam wavelengths may be employed according to the particular material to be ablated and the particular superabrasive material to be preserved. By way of non-limiting example, the laser ablation system 24 may employ helium-neon lasers, argon lasers, krypton lasers, nitrogen lasers, carbon dioxide lasers and carbon monoxide lasers, each optionally with an attenuator or other beam-modifying components. The laser 28 may be a pulsed laser, as previously described, or may alternatively be a continuous-wave laser. For example, a continuous-wave Nd:YAG laser with arc lamps may be employed and operated in pulse mode with a Q-switching technique, which technique may generate pulses with power exceeding 100 kW and having pulse widths between about 30 ns and 300 ns at pulse rates between about 10 kHz and 50 kHz. Other continuous-wave lasers are also within the scope of the present embodiments.

The fluence of the beam 30 may be controlled by passing the beam 30 through an optical attenuator 32. The attenuator 32 may be a co-axial optical attenuator, by way of non-limiting example. In other embodiments, the attenuator 32 may be an electro-optical attenuator. It is to be appreciated that any type of attenuator capable of attenuating the fluence or other characteristics of the beam 30 is within the scope of the present disclosure. The attenuator 32 may be configured to provide the beam 30 with a fluence greater than a threshold fluence for ablating a target material. For example, in embodiments where the volume of superabrasive material 4 comprises cobalt disposed within interstitial spaces between inter-bonded diamond crystals, the attenuator 32 may be configured to provide the beam 30 emitted by the laser 28 with a fluence greater than about 0.6 J/cm$^2$.

When employing a pulsed beam 30, the pulse width may be controlled through a number of techniques, such as gain switching of the laser 28 diodes, Q-switching, or passing the beam 30 through an electro-optical modulator (not shown). The pulse width of the beam 30 may be controlled to be between about 2 ns and 300 ns.

The laser 28 may be operatively coupled to the controller 31 and the controller 31 may be configured to control the amount of laser pulses or laser shots directed to a particular portion of the volume of superabrasive material 4. After a predetermined amount of laser pulses or laser shots are directed to the target, the controller 31 may manipulate the chuck 26 to present a different portion of the volume of superabrasive material 4 to the beam 30.

It is to be appreciated that, while non-limiting examples of suitable laser types and beam 30 wavelengths, fluences, pulse widths, pulse rates and numbers of laser pulses or laser shots are described herein, such parameters are only exemplary, as any of a variety of suitable laser types and beam 30 wavelengths, fluences, pulse widths, pulse rates and numbers of laser pulses or laser shots may be employed according to the particular material to be ablated and the superabrasive material to be preserved. Stated differently, the beam 30 may be tailored such that the interstitial material is ablated substantially without any degradation of the inter-bonded grains of superabrasive material or of bonds between the grains of superabrasive material.

With continued reference to FIG. 2, a beam splitter 34 may be positioned in the path of the beam 30 to deflect a fraction of the beam 30 to an energy meter 36 for measuring the beam 30 energy. The beam splitter 34 may be a 90%/10% beam splitter 34, i.e., the beam splitter 34 may be configured to deflect about 10% of the beam energy to the energy meter 36. However, in other embodiments, the beam splitter 34 may be configured to deflect as little as 1% or less of the beam 30 and as much as 80% or more of the beam 30 to the energy meter 36. The beam splitter 34 may incorporate any of various beam splitting mechanisms, such as a cube design comprising two coupled triangular glass prisms or a partially silvered mirror design, by way of non-limiting example. The energy meter 36 may include a joule meter and an energy detector for measuring the pulse energy of the beam 30. The energy detector may be a pyroelectric energy detector, by way of non-limiting example. It is to be appreciated that any detector type for measuring the beam 30 energy is within the scope of the present disclosure. The energy meter 36 may be in electronic communication with the processor of the controller 31 and may transmit data relating to the beam 30 energy to the controller 31. The controller 31 may interpret the beam 30 energy data and may modify the beam 30 fluence by adjusting the output of the laser 28. In additional embodiments, the controller 31 may provide for modification of the beam 30 fluence by specifying a different optical attenuator to be placed within the beam 30 path by an operating technician. In embodiments where the attenuator 32 is an electro-optical attenuator, the controller 31 may modify the beam 30 fluence by adjusting the operational parameters of the attenuator 32. The controller 31 may also modify the pulse width and pulse rate of the beam 30 and the number of laser pulses or laser shots by controlling operational parameters of the laser 28. In further embodiments, one or more beam splitters 34 may be employed to multiply the number of beams impinging against the volume of superabrasive material 4. In such embodiments, one or more of the split beams may be modified by an attenuator, as previously described.

At least one reflector 38 may be positioned within the beam 30 path and may be oriented to reflect the beam 30 toward a desired surface (i.e., "target surface") of the volume of superabrasive material 4 of the cutting element 2. While the reflector 38 is shown as being positioned downrange of the beam splitter 34, it is to be appreciated that the reflector 38 may be positioned in the beam 30 path between the laser 28 and the beam splitter 34 in other embodiments. A lens 40 may be positioned within the beam path between the reflector 38 and the volume of superabrasive material 4. The lens 40 may be oriented and configured to focus the beam 30 in a predetermined manner onto the target surface. By way of non-limiting example, the lens 40 may be a quartz lens with a focal length f of about 150 mm and may be positioned relative to the cutting face 10 to provide a spot size of about 2 mm x 3 mm on the target surface. However, it is to be appreciated that other types of lenses may be utilized and other focal lengths may be provided with other spot sizes on the target surface. Additionally, while only one beam splitter 34, one reflector 38 and one lens 40 are shown in FIG. 2, it is to be appreciated that any number of beam splitters 34, reflectors 38 and/or lenses 40 may be incorporated within the system to direct and focus any number of beams 30, or fractions thereof, to the volume of superabrasive material 4. In further embodiments, the laser ablation system 24 may direct a measurement beam (not shown) to the volume of superabrasive material 4 to measure depths at which interstitial material is ablated.

One or more optional gas jets 41 may be provided to enhance the ablation of interstitial material within the first region 20 of the volume of superabrasive material 4. For example, one or more gas jets 41 may be configured to direct a stream of gas at a location where the beam 30 impinges on the superabrasive material (i.e., the "contact zone"). The one or more gas jets 41 may be configured to direct a stream of gas at the contact zone before, during and/or after the beam 30 impinges thereat. The one or more gas jets 41 may provide one or more of a steady stream and a pulsed stream of gas. Furthermore, the composition of the gas may be selected or adjusted to catalyze ablation of the interstitial material. For example, in embodiments where the interstitial material comprises cobalt, the gas may comprise chlorine gas to further attack the cobalt.

The stream of gas may also entrain gaseous or other ablative byproducts therein and carry these byproducts away from the contact area to further enhance the efficiency at which interstitial material is removed from the first region 20 of the volume of superabrasive material 4. In this manner, the gas stream may carry ablative byproducts, including sublimated, gaseous-phase interstitial material, away from the microstructure of the superabrasive material before the gaseous-phase interstitial material reconstitutes within the microstructure. The gas stream may also cleanse pore spaces evacuated by the ablated material and enhance ablation at greater depths within the volume of superabrasive material 4 relative to depths achievable without the use of one or more gas jets 41. It is to be appreciated that the gas provided by the one or more optional gas jets 41 may be an inert gas or a reactive gas, depending on the particular function for which the gas is utilized during the ablation process. Any of various gases may be selected for use with the at least one gas jet 41 so long as the gas does not absorb an amount of the beam 30 wavelength to render the beam 30 ineffective at ablating interstitial material. Additionally, the one or more gas jets 41 may be oriented relative to the beam 30 and the target surface of the volume of superabrasive material 4 to reduce the amount of heat imparted to the gas stream by the beam 30 and to reduce turbulent gas flow at the contact zone, as turbulent gas flow at the contact zone may distort the beam 30 and reduce ablation efficiency. Furthermore, the cross-sectional area, shape and velocity of the stream of gas emitted by the gas jet 41 may be tailored to maximize the efficiency of ablation of the interstitial material. The one or more gas jets 41 may also assist with thermal management of the volume of superabrasive material 4 at and around the contact zone. For example, when the energy beam 30 is employed with a pulse rate above about 2 Hz, the one or more gas jets 41 may direct a stream of dry, thermally conductive gas, such as Helium gas, across the target surface to prevent excessive local heating of the superabrasive material and to blow away any plumes of ablated material that may otherwise scatter or absorb the energy beam 30 and reduce its effectiveness.

It is to be appreciated that, while the laser ablation system 24 depicted in FIG. 2 shows only one laser 28, two or more lasers 28 may be utilized to simultaneously ablate multiple regions of the volume of superabrasive material 4. Thus, while certain embodiments refer to only a single beam 30, it is to be appreciated that more than one beam 30 may be employed. When two or more lasers 28 are employed, the two or more lasers 28 may be configured to emit beams 30 at the same wavelength or at different wavelengths. Furthermore, in embodiments with two or more lasers 28, one of the lasers 28 may be configured to emit a beam 30 at a first wavelength to be absorbed by a first interstitial material and the second laser 28 may be configured to emit a beam 30 at a second wavelength to be absorbed by a second interstitial material. In other embodiments with two or more lasers 28, one of the lasers 28 may emit a first beam 30 at a first wavelength that is substantially not absorbed by, and substantially does not melt or diffuse, the interstitial material and another of the lasers 28 may emit a second beam 30 at a second wavelength that is also substantially not absorbed by, and substantially does not melt or diffuse, the interstitial material, wherein the intersection of the first and second beams may cause an interference wavelength that is absorbed by the interstitial material and thus ablates the interstitial material. In embodiments where two or more lasers 28 are employed, the laser ablation system 24 may include any combination of attenuators 32, beam splitters 34, reflectors 38 and lenses 40 to tailor each beam 30, including the fluence, pulse width, pulse rate, number of laser pulses or laser shots and spot size thereof, to the particular interstitial materials to be ablated, the superabrasive material to be preserved, and the particular predetermined ablation pattern. Furthermore, in such embodiments, a gas jet 41 may be provided for each contact zone of each beam 30 impinging against the volume of superabrasive material 4. In other embodiments employing two or more lasers 28, gas jets 41 may be provided at a quantity of more than or fewer than the number of beams 30 impinging against the volume of superabrasive material 4.

Figure 3:
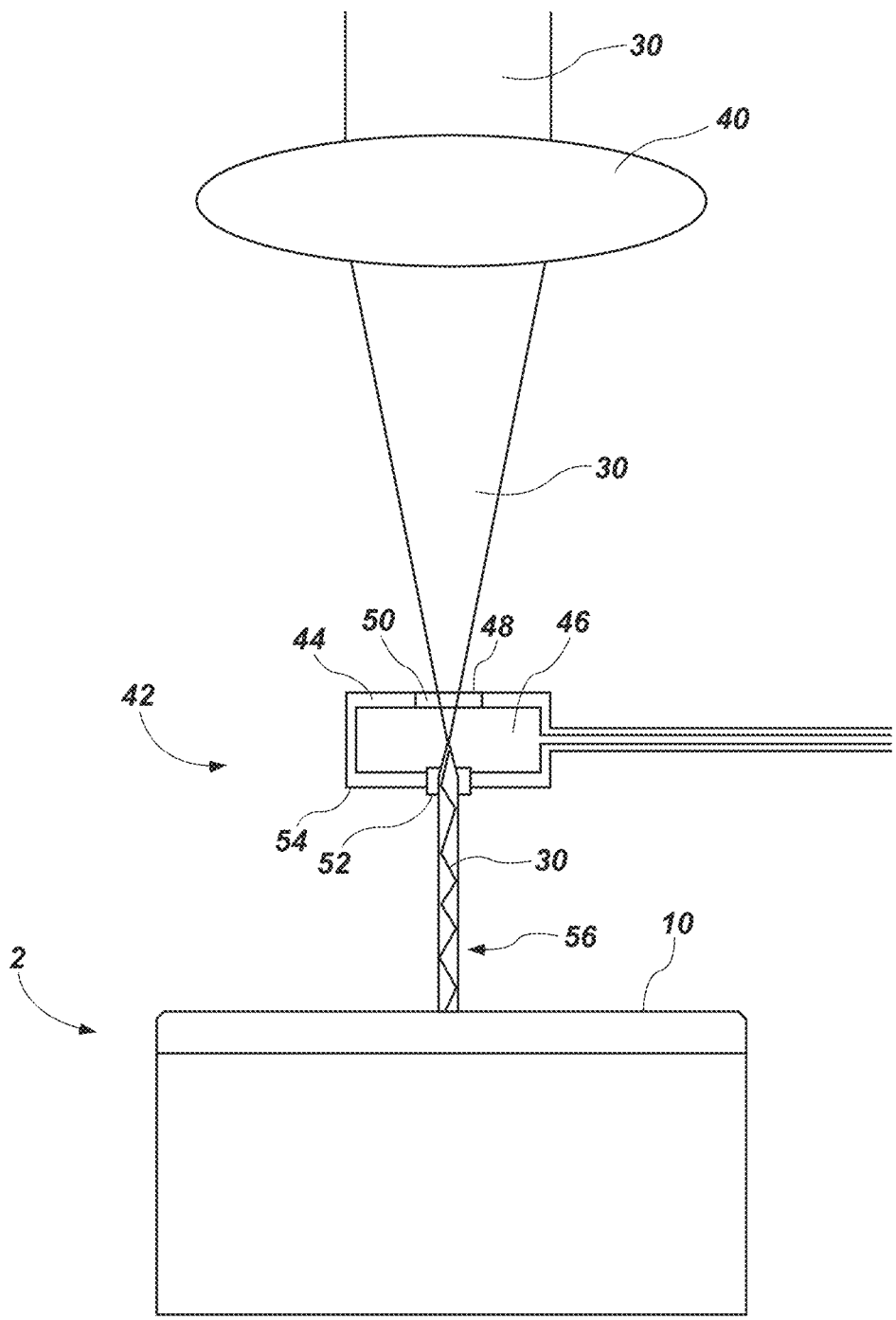
FIG. 3 illustrates an optional laser microjet device for use with the laser ablation system of FIG. 2.

FIG. 3 illustrates an optional laser microjet 42 that may be utilized with the laser ablation system 24 of FIG. 2. The laser microjet 42 may be positioned within the beam 30 path between the lens 40 and the cutting element 2. The laser microjet 42 may include a body 44 housing a water chamber 46 in communication with a water reservoir and a low pressure pump (not shown). A top surface 48 of the body 44 may carry a transparent window 50 in-line with the beam 30, the water chamber 46 and a nozzle 52 carried by a bottom surface 54 of the body 44, the nozzle 52 being in fluid communication with the water chamber 46. A low pressure jet of water 56 may be ejected from the water chamber 46 through the nozzle 52 toward the target surface of the volume of superabrasive material 4. The beam 30 may be directed through the transparent window 50 of the laser microjet 42 and may be guided to the cutting face 10, or any other target surface, by total internal reflection within the water jet 56. The water jet 56 may assist with removing gaseous or other ablative byproducts from the contact area and may additionally cool the cutting element 2 during the ablation process. The inherent non-uniformity of the water jet 56 may also split the beam 30 into a multiplicity of beams 30 within the water jet 56, wherein each of the multiplicity of beams 30 impinges against the volume of superabrasive material 4 at a different angle, enhancing the size of the ablation region and increasing ablation efficiency. In other embodiments, water may be flowed across the target surface of the volume of superabrasive material 4 at the contact zone by other means. In further embodiments, the target surface of the volume of superabrasive material 4 may be at least partially immersed in water or another liquid while the energy beam 30 impinges against the target surface.

The laser ablation system 24 described in reference to FIG. 2 provides significant advantages over state of the art leaching processes in relation to removing interstitial material located between the grains of superabrasive material. With chemical leaching processes, any non-linear leaching profile requires a series of masking operations and re-leaching processes on the volume of superabrasive material 4. Leaching processes including masking operations are disclosed in U.S. Pat. No. 8,839,889, issued Sep. 23, 2014 to DiGiovanni et al., the entire disclosure of which is hereby incorporated herein by this reference. However, with the laser ablation system 24 disclosed herein, complex, non-linear leaching profiles in the volume of superabrasive material 4 may be achieved merely by adjusting parameters of the laser beam 30, such as the beam wavelength, fluence, pulse width, pulse rate, number of laser pulses or laser shots, spot size, number of beams 30 and spacial patterning of the beam 30 contact zones.

Figure 4:
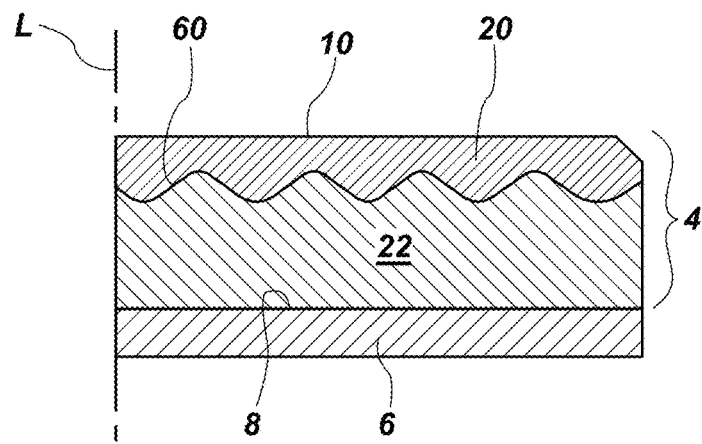
FIG. 4 illustrates a partial cross-sectional view of a cutting element having a volume of superabrasive material with an ablated region having a non-planar ablation boundary, according to an embodiment of the present disclosure.
Figure 5:
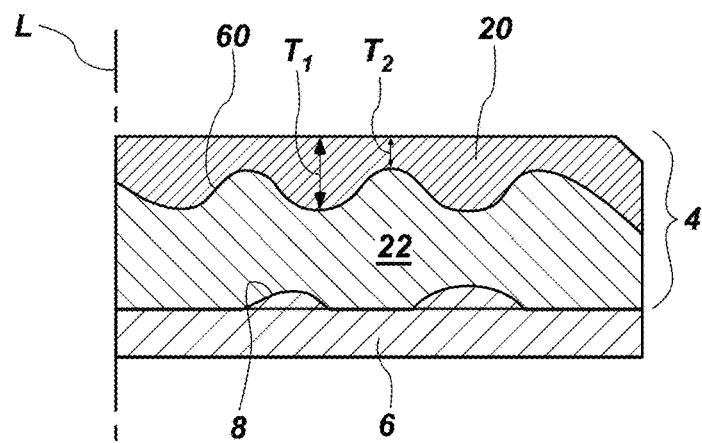
FIG. 5 illustrates a partial cross-sectional view of a cutting element having a volume of superabrasive material with an ablated region having a non-planar ablation boundary in conjunction with a non-planar interface between the volume of superabrasive material and a supporting substrate, according to an embodiment of the present disclosure.
Figure 6:
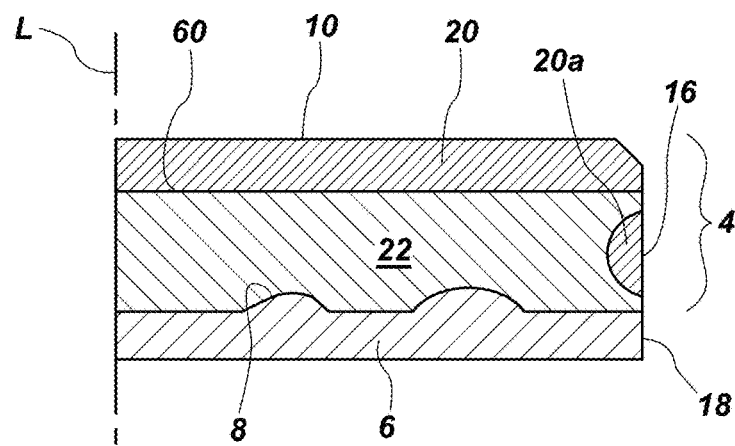
FIG. 6 illustrates a partial cross-sectional view of a cutting element having a volume of superabrasive material with an ablated region having a planar ablation boundary in conjunction with a non-planar interface between the volume of superabrasive material and the substrate, the ablated region including a separate peripheral region adjacent a side surface of the volume of superabrasive material, according to an embodiment of the present disclosure.

Referring now to FIGS. 4 through 6, examples of ablation profiles in cross-sections of volumes of superabrasive material 4 are shown as achieved with the laser ablation system 24 described above. The laser ablation system 24 may be utilized to ablate interstitial material located between the inter-bonded grains of superabrasive material within the first region 20 of the volume of superabrasive material 4, while interstitial material may remain between the grains of superabrasive material within the second region 22. As shown in FIGS. 4 and 5, a boundary 60 between the first region 20 and the second region 22 may include three-dimensional geometries with various cross-sectional profiles. For example, such a boundary 60 may have a non-linear profile when viewed in a longitudinal plane bisecting the volume of superabrasive material 4. For example, the boundary 60 may have a generally sinusoidal profile, as shown in FIGS. 4 and 5. With reference to FIG. 5, such a profile may cause the first region 20 to have a maximum thickness $T_1$ at "troughs" of the sinusoidal boundary 60 and a minimum thickness $T_2$ at "peaks" of the boundary 60 (as the boundary 60 is depicted in FIG. 5). It is to be appreciated that, in some embodiments, the peaks and troughs of the boundary 60 may extend, in three-dimensional space, linearly in a direction perpendicular to the cross-sectional plane of FIGS. 4 and 5 (i.e., in a direction into and outward from the page from the vantage of a person viewing the Figures). In other embodiments, the peaks and troughs may extend, in three-dimensional space, annularly around the volume of superabrasive material 4 about the longitudinal axis L thereof. In further embodiments, the peaks and troughs may extend, in three-dimensional space, sinusoidally in a direction perpendicular to the cross-sectional plane of FIGS. 4 and 5.

To form the respective peaks and troughs of the sinusoidal boundary 60 profile, the chuck 26 may position the cutting element 2 such that the beam 30 delivers more laser pulses or laser shots to locations of the volume of superabrasive material 4 associated with the troughs than the number of laser pulses or laser shots delivered to locations of the volume of superabrasive material 4 associated with the peaks. The depth of the troughs may also be controlled by modifying the angle at which the beam 30 impinges against the target surface of locations of the target surface corresponding to the troughs. The depths of the troughs may also be controlled by modifying the pulse width and/or fluence of the beam 30 at locations of the target surface corresponding to the troughs, as previously described. The depth of interstitial material removed within the volume of superabrasive material 4 will at least partially depend on the ablation rate of the interstitial material, which ablation rate may be a function of a number of factors. For example, when a pulsed laser is employed, each pulse may advance the ablation depth a distance of between about 0.02 µm to about 0.14 µm deeper into the volume of superabrasive material 4, depending upon the wavelength, fluence, pulse rate, pulse width and the number of pulses. The laser ablation system 24 disclosed herein may be capable of providing an ablation depth of at least about 1.00 mm. The chuck 26 may position the cutting element 2 relative to the beam 30 such that the beam 30 ablates interstitial material within the first region 20 in a single pass or multiple passes. It is to be appreciated that the three-dimensional boundary 60 of the first region 20 may be formed by selectively manipulating and/or varying one or more of the beam 30 wavelength, fluence, pulse width, pulse rate, number of laser pulses or laser shots and the spot size on the target surface. The controller 31 may be programmed with any number of various spatial patterns for the ablation boundary 60 in the volume of superabrasive material 4.

In other embodiments, the chuck 26 may remain generally stationary and the laser 28 may be positioned and controlled in a manner analogous to standardized computer numerical control (CNC) machining processes employed in various other applications. In such embodiments, the laser 28 may be controlled by the controller 31. In further embodiments, the chuck 26 and the laser 28 may remain stationary while an assembly of beam splitters 34, reflectors 38 and/or lenses 40 may be collectively configured and oriented to provide the desired spacial ablating pattern. In such embodiments, the laser ablation system 24 may include active optics, such as multi-axis tip-tilt piezoelectric steering mirrors. In other embodiments, a predetermined spacial ablating pattern may be provided by a programmable laser etcher or marker.

Referring now to FIG. 6, the laser ablation system 24 may be utilized to form a generally linear boundary between the first region 20 and the second region 22 of the volume of superabrasive material 4. Additionally, the first region 20 may include a peripheral portion 20a adjacent the side surface 16 of the volume of superabrasive material 4, which peripheral portion 20a may be separated from the remainder of the first region 20a by a portion of the second region 22. The peripheral portion 20a may extend annularly around an entire circumference of the side surface 16 of the volume of superabrasive material 4, annularly around less than the entire circumference of the side surface 16, or as annular segments around the entire or less than the entire circumference of the side surface 16. The peripheral portion 20a of the first region may be shaped as disclosed in U.S. Pat. No. 8,839,889, issued Sep. 23, 2014 to DiGiovanni et al. and U.S. Pat. No. 7,730,977, issued Jun. 8, 2010 to Achilles. In other embodiments, the peripheral portion 20a of the first region 20 may be utilized with a remaining portion of the first region 20 having a non-linear profile. Interstitial material within the peripheral portion 20a of the first region 20 may be ablated according to any of the parameters previously described in reference to FIG. 5. It is to be appreciated that the boundary 60 profiles depicted in FIGS. 4 through 6 represent merely a few of the virtually limitless number of boundary 60 profiles achievable with the laser ablation system 24 described in reference to FIG. 2. Additionally, non-planar boundaries 64 between the first and second regions 20, 22 of the volume of superabrasive material 4 may be utilized in conjunction with non-planar interfaces 8 between the volume of superabrasive material 4 and the substrate 6, as shown in FIGS. 5 and 6.

Figure 7:
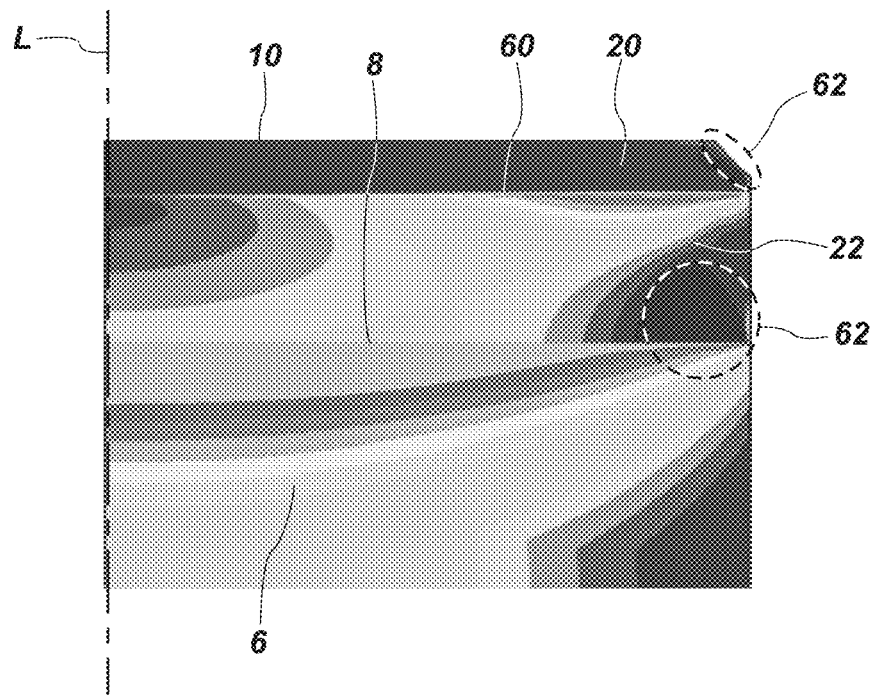
FIG. 7 illustrates a diagram of residual stresses within a prior art cutting element having a leached volume of superabrasive material with a planar leach boundary.
Figure 8:
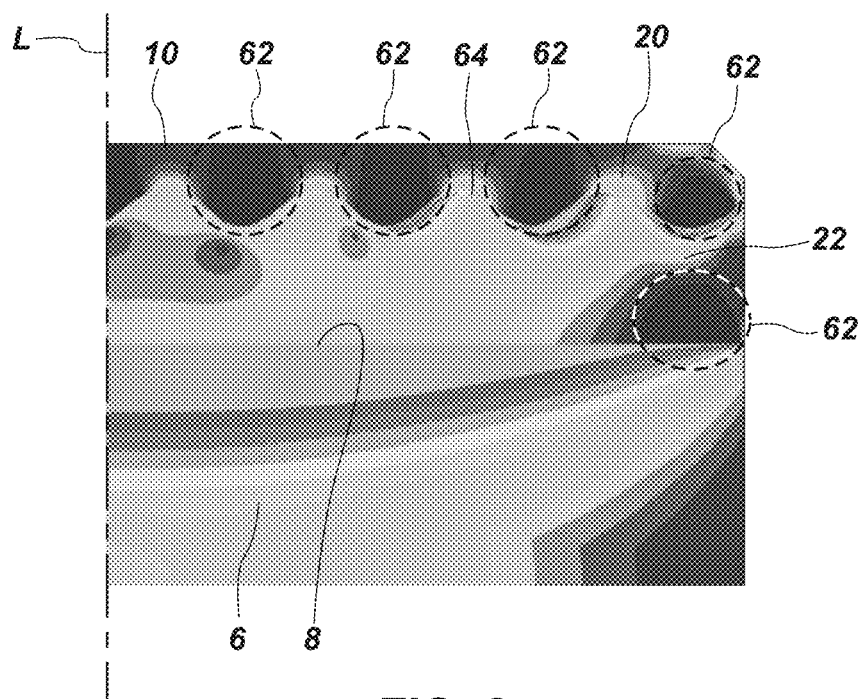
FIG. 8 illustrates a diagram of residual stresses within a cutting element having a laser-ablated volume of superabrasive material with a sinusoidal ablation boundary, according to an embodiment of the present disclosure.

FIGS. 7 and 8 illustrate residual stress patterns of two different cutting elements—one having a planar leach boundary 60 (FIG. 7) and the other having a non-planar ablation boundary 60 (FIG. 8). Residual stresses form within the cutting element 2 as the cutting element 2 cools following the HTHP process in which the cutting element 2 is formed, as previously described. In particular, because the substrate 6 may possess a greater coefficient of thermal expansion than the volume of superabrasive material 4, the substrate 6 may contract to a greater extent during cooling than the volume of superabrasive material 4, creating undesirable residual tensile stresses in the cutting element 2, particularly at the interface 8 between the volume of superabrasive material 4 and the substrate 6, but also at the cutting face 10 and regions between the interface 8 and the cutting face 10. Undesirable residual stresses within the volume of superabrasive material 4 may lead or contribute to cracking, spalling, delamination or other modes of failure of the volume of superabrasive material 4 during use in an earth-boring operation.

As shown in FIG. 7, a cutting element 2 having a volume of superabrasive material 4 with a planar leach boundary 60 possesses generally uniform residual stresses within the leached first region 20 of the volume of superabrasive material 4, providing a generally uniform pathway for face cracks and spalls to propagate through the superabrasive material during use in an earth-boring operation. In comparison, as shown in FIG. 8, the volume of superabrasive material 4 having a laser-ablated first region 20 with a sinusoidal ablation boundary 60 provides distinct, relatively high compressive stress regions 62 associated with the troughs of the first region 20, which compressive stress regions 62 essentially "deflect," or prevent, propagation of face cracks and spalls therethrough. Accordingly, the laser ablation system 24 disclosed herein is advantageous over prior art leaching methods because it can provide tailored, favorable residual stress patterns within a volume of superabrasive material 4 that resist cracking, spalling, delamination and other failure modes.

It is to be appreciated that the embodiments disclosed herein provide shaping of complex boundary 60 patterns to a level of precision that would otherwise be unachievable by prior art leaching methods. It is also to be appreciated that the laser ablation system 24 disclosed herein may be employed to ablate interstitial material from any structure comprising a volume of superabrasive material. For example, it is known in the art to form a volume of superabrasive material over a substrate, to remove the volume of superabrasive material from the substrate and attach the volume of superabrasive material to a different substrate. It is also known in the art to leach interstitial material from a volume of superabrasive material and subsequently provide a different interstitial material within the volume of superabrasive material. The laser ablation system 24 disclosed herein may be employed to ablate interstitial material from any of the foregoing types of volumes of superabrasive material.

In further embodiments, the laser ablation system 24 previously disclosed in reference to FIG. 2 may be employed in tandem with a chemical leaching process to remove interstitial material from the volume of superabrasive material 4. In such embodiments, a surface of the volume of superabrasive material 4 may be immersed in a leaching agent, such as those leaching agents previously described, and an energy beam 30 may be concurrently directed onto the immersed surface of the volume of superabrasive material 4 to ablate the interstitial material within the volume of superabrasive material 4. In this manner, the rate of removal of interstitial material from the superabrasive material may be increased. It is also to be appreciated that a selected surface of the volume of superabrasive material 4 may be leached prior to or after laser-ablating interstitial material adjacent the selected surface with an energy beam 30. For example, to impart the volume of superabrasive material 4 with a predetermined, non-planar ablation/leach boundary, the volume of superabrasive material 4 may be exposed to one or more energy beams 30 at one or more locations to form one or more features of a preliminary non-planar ablation boundary. The volume of superabrasive material 4 may subsequently be leached with a chemical leaching agent, which leaching agent may generally advance the preliminary, previously defined ablation boundary deeper into the volume of superabrasive material 4.

It is to be appreciated that the embodiments disclosed herein provide enhanced methods, systems and mechanisms for removing interstitial material from a volume of superabrasive material 4. The embodiments disclosed herein also provide for the formation of more geometrically intricate and/or complex, tailored leach/ablation boundaries. The embodiments disclosed herein also provide significant reductions in the time and costs required to remove interstitial material from a volume of superabrasive material 4.

While certain illustrative embodiments have been described in connection with the Figures, those of ordinary skill in the art will recognize and appreciate that the scope of this disclosure is not limited to those embodiments explicitly shown and described herein. Rather, many additions, deletions, and modifications to the embodiments described herein may be made to produce embodiments within the scope of this disclosure, such as those hereinafter claimed, including legal equivalents. In addition, features from one disclosed embodiment may be combined with features of another disclosed embodiment while still being within the scope of this disclosure, as contemplated by the inventors.

What is claimed is:

1. A method of forming a polycrystalline compact, the method comprising:
   directing a beam of energy at a volume of polycrystalline superabrasive material comprising inter-bonded grains; and
   forming a sinusoidal boundary comprising peaks and troughs, the sinusoidal boundary located between a region of the volume of polycrystalline superabrasive material that is adjacent to an outer surface of the volume and another region of the volume that is adjacent to a substrate;
   wherein forming the sinusoidal boundary comprises sublimating at least a portion of interstitial material disposed between the inter-bonded grains in the region of the volume of polycrystalline superabrasive material that is adjacent to the outer surface of the volume to remove at least a portion of the interstitial material from the region of the volume that is adjacent to the outer surface of the volume.

2. The method of claim 1, wherein sublimating at least a portion of the interstitial material disposed between the inter-bonded grains in a region of the volume of polycrystalline superabrasive material comprises removing the interstitial material from the region without removing the interstitial material from the region that is adjacent to the substrate.

3. The method of claim 1, further comprising:
   directing at least one additional beam of energy at the volume of polycrystalline superabrasive material; and
   sublimating at least another portion of the interstitial material from another region adjacent to the outer surface of the volume of polycrystalline superabrasive material.

4. The method of claim 1, further comprising emitting the beam of energy from a laser.

5. The method of claim 4, wherein emitting the beam of energy comprises emitting a beam of energy having a wavelength between 200 nm and 800 nm.

6. The method of claim 4, wherein emitting the beam of energy comprises emitting a beam of energy having a fluence between 0.25 J/cm$^2$ and 25 J/cm$^2$.

7. The method of claim 4, wherein emitting the beam of energy comprises emitting a beam of energy having a pulse width between 2 ns and 300 ns.

8. The method of claim 1, wherein sublimating at least a portion of the interstitial material comprises sublimating a catalytic material.

9. The method of claim 8, wherein sublimating at least a portion of the interstitial material comprises sublimating a material selected from the group consisting of cobalt, iron, nickel, and alloys and mixtures thereof.

10. The method of claim 1, wherein sublimating at least a portion of the interstitial material comprises sublimating a non-catalytic material.

11. The method of claim 1, wherein directing a beam of energy at a volume of polycrystalline superabrasive material comprises directing the beam of energy at inter- bonded grains of diamond material.

12. The method of claim 1, further comprising modifying the beam of energy with an optical or electro-optical attenuator.

13. The method of claim 1, further comprising directing a stream of gas toward a location where the beam of energy impinges against the volume of polycrystalline superabrasive material.

14. The method of claim 13, wherein directing a stream of gas comprises selecting a composition of at least a constituent of the gas to enhance degradation of the interstitial material by the beam of energy.

15. The method of claim 1, further comprising focusing the beam of energy onto the volume of polycrystalline superabrasive material with a lens.

16. The method of claim 1, further comprising flowing water across a surface of the volume of polycrystalline superabrasive material substantially at a location at which the beam of energy impinges against a surface of the volume of polycrystalline superabrasive material.

17. The method of claim 1, further comprising manipulating the volume of polycrystalline superabrasive material relative to the beam of energy while directing the beam of energy at the volume of polycrystalline superabrasive material.

18. The method of claim 1, further comprising leaching material through a surface of the volume of polycrystalline superabrasive material with a chemical leaching agent.

19. The method of claim 1, further comprising deflecting a portion of the beam of energy toward an energy meter.

20. The method of claim 1, wherein directing a beam of energy at a volume of polycrystalline superabrasive material comprises directing a beam of particles at the volume of polycrystalline superabrasive material.

21. The method of claim 1, further comprising forming the sinusoidal boundary such that the peaks and the troughs extend, in a plane in three-dimensional space, radially around, and perpendicular to a longitudinal axis at a center of the polycrystalline compact.

22. The method of claim 1, further comprising forming the sinusoidal boundary such that the peaks and the troughs extend, in a plane in three-dimensional space, axially outwardly from, and perpendicular to a longitudinal axis at a center of the polycrystalline compact.

23. The method of claim 1, further comprising forming the sinusoidal boundary such that the peaks and the troughs extend, in both an x direction and a y direction a plane in three-dimensional space, perpendicular to a longitudinal axis at a center of the polycrystalline compact.

* * * * *